US012683193B2

(12) United States Patent
Lee et al.

(10) Patent No.: US 12,683,193 B2
(45) Date of Patent: Jul. 14, 2026

(54) ELECTROLYTE AND LITHIUM METAL SECONDARY BATTERY COMPRISING SAME

(71) Applicant: LG Energy Solution, LTD., Seoul (KR)

(72) Inventors: Jeongbeom Lee, Daejeon (KR); Hoejin Hah, Daejeon (KR); Yeeun Kim, Daejeon (KR)

(73) Assignee: LG Energy Solution, LTD., Seoul (KR)

(*) Notice: Subject to any disclaimer, the term of this patent is extended or adjusted under 35 U.S.C. 154(b) by 599 days.

(21) Appl. No.: 17/772,062

(22) PCT Filed: Oct. 30, 2020

(86) PCT No.: PCT/KR2020/015047
§ 371 (c)(1),
(2) Date: Apr. 26, 2022

(87) PCT Pub. No.: WO2021/125546
PCT Pub. Date: Jun. 24, 2021

(65) Prior Publication Data

US 2022/0367916 A1 Nov. 17, 2022

(30) Foreign Application Priority Data

Dec. 19, 2019 (KR) ........................ 10-2019-0170942
Oct. 29, 2020 (KR) ........................ 10-2020-0141979

(51) Int. Cl.
*H01M 10/0569* (2010.01)
*H01M 4/02* (2006.01)
(Continued)

(52) U.S. Cl.
CPC ....... *H01M 10/0569* (2013.01); *H01M 4/382* (2013.01); *H01M 10/0568* (2013.01);
(Continued)

(58) Field of Classification Search
CPC ......... H01M 10/0569; H01M 10/0568; H01M 10/052; H01M 4/382; H01M 50/46;
(Continued)

(56) References Cited

U.S. PATENT DOCUMENTS

2006/0124973 A1 6/2006 Arai et al.
2012/0164519 A1 6/2012 Lee et al.
(Continued)

FOREIGN PATENT DOCUMENTS

CN 106169610 A 11/2016
CN 108780923 A 11/2018
(Continued)

OTHER PUBLICATIONS

KR 20190058134 English Translation (Year: 2019).*
(Continued)

*Primary Examiner* — Allison Bourke
*Assistant Examiner* — Travis L. Martin
(74) *Attorney, Agent, or Firm* — Bryan Cave Leighton Paisner LLP

(57) ABSTRACT

An electrolyte for a lithium metal secondary battery is provided. The electrolyte comprises a lithium salt and a non-aqueous solvent and provides improved lifespan characteristics and high rate charging performance when applied to a secondary battery including a lithium metal as a negative electrode active material due to fewer side reactions and excellent stability of the electrolyte.

5 Claims, 2 Drawing Sheets

(51) Int. Cl.
*H01M 4/38* (2006.01)
*H01M 10/0568* (2010.01)
*H01M 50/46* (2021.01)

(52) U.S. Cl.
CPC ...... *H01M 50/46* (2021.01); *H01M 2004/027* (2013.01); *H01M 2300/0037* (2013.01)

(58) Field of Classification Search
CPC ... H01M 2004/027; H01M 2300/0037; H01M 2300/004; H01M 2300/0034; Y02E 60/10
See application file for complete search history.

(56) References Cited

U.S. PATENT DOCUMENTS

| | | | |
|---|---|---|---|
| 2012/0321940 | A1 | 12/2012 | Kawasaki et al. |
| 2013/0252113 | A1 | 9/2013 | Yu et al. |
| 2015/0140443 | A1 | 5/2015 | Takahashi et al. |
| 2015/0303521 | A1 | 10/2015 | Sasaki et al. |
| 2016/0190646 | A1 | 6/2016 | Kim et al. |
| 2016/0344063 | A1 | 11/2016 | Chang et al. |
| 2017/0098858 | A1 | 4/2017 | Kim et al. |
| 2017/0117578 | A1 | 4/2017 | Seo et al. |
| 2017/0117579 | A1 | 4/2017 | Seo et al. |
| 2018/0108935 | A1 | 4/2018 | Noguchi et al. |
| 2018/0145371 | A1 | 5/2018 | Maeda et al. |
| 2018/0175450 | A1 | 6/2018 | Chesneau et al. |
| 2019/0020063 | A1 | 1/2019 | Kim et al. |
| 2019/0081346 | A1 | 3/2019 | Yun et al. |
| 2019/0173124 | A1 | 6/2019 | Zhang et al. |
| 2019/0198932 | A1 | 6/2019 | Newhouse et al. |
| 2019/0198933 | A1 | 6/2019 | Newhouse et al. |
| 2019/0252723 | A1 | 8/2019 | Hoecker et al. |
| 2019/0341654 | A1 | 11/2019 | Yu et al. |
| 2019/0363396 | A1 | 11/2019 | Hasegawa |
| 2021/0399345 | A1 | 12/2021 | Yu et al. |

FOREIGN PATENT DOCUMENTS

| | | | |
|---|---|---|---|
| CN | 108832149 | A | 11/2018 |
| CN | 108886139 | A | 11/2018 |
| CN | 109690860 | A | 4/2019 |
| CN | 109792086 | A | 5/2019 |
| CN | 110061291 | A | 7/2019 |
| CN | 108604709 | A | 9/2019 |
| EP | 2469633 | | 6/2012 |
| EP | 3151314 | | 4/2017 |
| KR | 10-2017-0047656 | A | 5/2017 |
| KR | 10-2017-0047657 | A | 5/2017 |
| KR | 10-2017-0111745 | A | 10/2017 |
| KR | 10-2018-0020226 | A | 2/2018 |
| KR | 10-2018-0057437 | A | 5/2018 |
| KR | 10-2019-0058134 | A | 5/2019 |
| WO | 2011-118387 | A1 | 9/2011 |
| WO | 2014-080871 | A1 | 5/2014 |
| WO | 2016-175217 | A1 | 11/2016 |
| WO | 2017010255 | | 1/2017 |
| WO | 2018054710 | A1 | 3/2018 |
| WO | 2019188360 | | 10/2019 |

OTHER PUBLICATIONS

Carl Roth GmbH, Safety Data Sheet for 1,2-Dimethoxyethane (Year: 2024).*

Watson International Ltd., Safety Data Sheet for Lithium bis(fluorosulfonyl)imide (Year: 2017).*

Tokyo Chemical Industry Co., Ltd., Safety Data Sheet for 1H, 1H,5H-Octafluoropentyl 1,1,2,2-Tetrafluoroethyl Ether (Year: 2023).*

* cited by examiner

【FIG. 1】
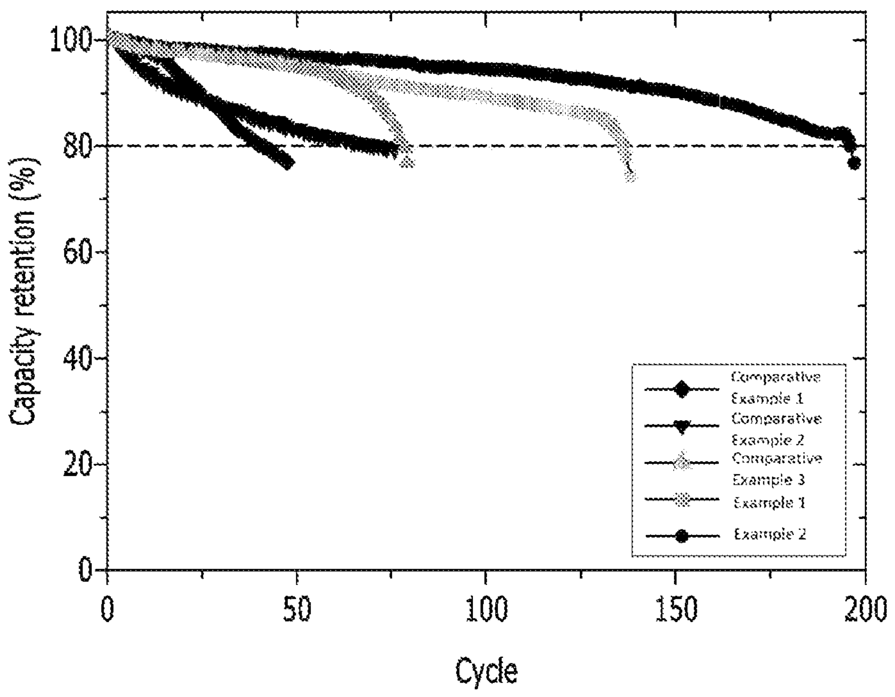

【FIG. 2】
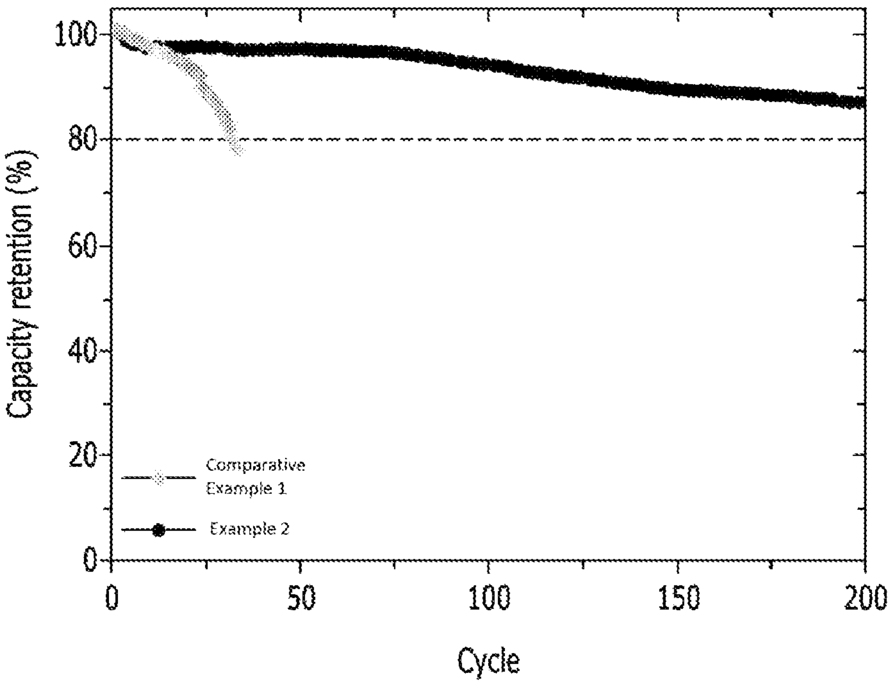

ELECTROLYTE AND LITHIUM METAL SECONDARY BATTERY COMPRISING SAME

CROSS-REFERENCE TO RELATED APPLICATION

The present application is a National Stage Application of International Application No. PCT/KR2020/015047 filed on Oct. 30, 2020, which claims priority to Korean Patent Application Nos. 10-2019-0170942 and 10-2020-0141979, filed on Dec. 19, 2019 and Oct. 29, 2020, respectively, the disclosures of which are incorporated herein by reference herein in their entireties.

FIELD

The present disclosure relates to an electrolyte for a lithium metal secondary battery, which is applied to a lithium metal secondary battery including a lithium metal as a negative electrode active material to improve lifespan characteristics of the battery.

BACKGROUND

With rapid development of the electronics, communication, and computer industries, application fields of the energy storage technologies are expanded to camcorders, mobile phones, laptop computers, PCs, and even to electric vehicles. Accordingly, development of high-performance secondary batteries which are lightweight, have a long life-time, and have high reliability is in progress.

Among currently applied secondary batteries, lithium secondary batteries developed in early 1990s have received attentions due to advantages of having a high operating voltage and significantly high energy density, as compared with traditional batteries such as Ni-MH, Ni—Cd, and sulfuric acid-lead batteries using an aqueous liquid electrolyte.

Lithium metal, carbon-based materials, and silicon are used as negative electrode active materials for lithium secondary batteries. Among them, lithium metal has an advantage of obtaining the highest energy density, and thus continuous research has been conducted.

A lithium electrode using a lithium metal as an active material is generally manufactured by using a flat copper or nickel foil as a current collector and attaching a lithium foil thereon. Alternatively, there is known a method of using a lithium foil itself as a lithium electrode without a separate current collector, or a method of assembling a battery using only a current collector without the lithium foil, and then charging and discharging the battery to form a lithium metal layer which is then used as a negative electrode.

However, lithium secondary batteries including the lithium metal electrode have problems in that a stable interface may not be formed between an electrolyte and the lithium metal electrode and continuous decomposition of the electrolyte occurs due to high reactivity of the lithium metal and surface unevenness which occurs during electrodeposition and separation of the lithium metal onto/from the electrode upon charge/discharge of the battery. These side reactions of electrolyte not only rapidly increase battery resistance, but also deplete the electrolyte and available lithium in the battery, which may cause deterioration of battery lifetime.

SUMMARY

In order to solve the above problems, there is provided a non-aqueous electrolyte having excellent stability against lithium metals.

Accordingly, according to one embodiment of the present disclosure, provided is an electrolyte for a lithium metal secondary battery, the electrolyte including a lithium salt and a non-aqueous solvent, wherein a concentration of the lithium salt is more than 2.0 M to 4.0 M or less, and wherein the lithium salt includes lithium bis(fluorosulfonyl)imide, and the non-aqueous solvent includes 1H,1H,5H-octafluoropentyl-1,1,2,2-tetrafluoroethyl ether; a cyclic fluorinated carbonate; and one or more solvents selected from the group consisting of chain carbonate, chain ester, and chain ether solvents, and the 1H,1H,5H-octafluoropentyl-1,1,2,2-tetrafluoroethyl ether is included in an amount of 32% by volume or less with respect to the total volume of the non-aqueous solvent.

In one specific embodiment, the 1H,1H,5H-octafluoropentyl-1,1,2,2-tetrafluoroethyl ether may be included in an amount of 10% by volume to 30% by volume with respect to the total volume of the non-aqueous solvent.

In one specific embodiment, the cyclic fluorinated carbonate may be included in an amount of 5% by volume to 30% by volume with respect to the total volume of the non-aqueous solvent.

In one specific embodiment, the cyclic fluorinated carbonate may be one or more selected from the group consisting of fluoroethylene carbonate, difluoroethylene carbonate, and trifluoromethylethylene carbonate.

In one specific embodiment, the chain carbonate may be one or more selected from the group consisting of dimethyl carbonate, diethyl carbonate, dipropyl carbonate, ethylmethyl carbonate, methylpropyl carbonate, and ethylpropyl carbonate.

In one specific embodiment, the chain ester may be one or more selected from the group consisting of methyl acetate, ethyl acetate, propyl acetate, methyl propionate, ethyl propionate, and propyl propionate.

In one specific embodiment, the chain ether may be one or more selected from the group consisting of diethyl ether, dipropyl ether, methylpropyl ether, and ethylpropyl ether.

In one specific embodiment, one or more solvents selected from the group consisting of the chain carbonate, chain ester, and chain ether solvents may be one or more selected from the group consisting of dimethyl carbonate, diethyl carbonate, methyl propionate, ethyl propionate, and diethyl ether.

In one specific embodiment, the electrolyte may include lithium bis(fluorosulfonyl)imide in an amount of 20% by weight to 50% by weight with respect to the total weight of the electrolyte.

In one specific embodiment, the electrolyte may include the lithium salt at a concentration of 2.1 M to 3.0 M.

Further, according to another embodiment of the present disclosure, provided is a lithium metal secondary battery including the electrolyte.

Specifically, the lithium metal secondary battery includes a positive electrode; a lithium metal negative electrode; a separator interposed between the positive electrode and the negative electrode; and the above-described electrolyte of the present disclosure.

An electrolyte for a lithium metal secondary battery of the present disclosure has excellent stability against lithium metals, and thus the electrolyte has fewer side reactions. Accordingly, the electrolyte may be applied to lithium metal secondary batteries to improve lifespan characteristics and high rate charging performance of the batteries.

DESCRIPTION OF DRAWINGS

FIG. 1 shows results of measuring capacity retention at 25° C. for respective batteries of Examples 1 and 2, and Comparative Examples 1 to 3; and FIG. 2 shows results of measuring capacity retention at 45° C. for respective batteries of Example 2 and Comparative Example 1.

DETAILED DESCRIPTION

The terms used in this description are just for explaining exemplary embodiments and it is not intended to restrict the present disclosure. The singular expression may include the plural expression unless it is differently expressed contextually. It must be understood that the term “include”, “equip”, or “have” in the present description is only used for designating the existence of characteristics taken effect, steps, components, or combinations thereof, and do not exclude the existence or the possibility of addition of one or more different characteristics, steps, components or combinations thereof beforehand.

The present disclosure may be variously modified and have various forms, and specific embodiments will be illustrated and described in detail as follows. It should be understood, however, that the description is not intended to limit the present disclosure to the particular forms disclosed, but on the contrary, the intention is to cover all modifications, equivalents, and alternatives falling within the spirit and scope of the present disclosure.

Hereinafter, the present disclosure will be described in detail.

Electrolyte for Lithium Metal Secondary Battery

An electrolyte for a lithium metal secondary battery according to one embodiment of the present disclosure includes a lithium salt and a non-aqueous solvent, wherein a concentration of the lithium salt is more than 2.0 M to 4.0 M or less, the electrolyte including lithium bis(fluorosulfonyl)imide (LiFSI) as the lithium salt; and 1H,1H,5H-octafluoropentyl-1,1,2,2-tetrafluoroethyl ether (OTE); a cyclic fluorinated carbonate; and one or more solvents selected from the group consisting of chain carbonate, chain ester, and chain ether solvents as the non-aqueous solvent. In this regard, the OTE is included in an amount of 32% by volume or less with respect to the total volume of the non-aqueous solvent.

The present inventors have continuously studied a non-aqueous electrolyte composition suitable for use in a lithium metal battery containing a lithium metal as a negative electrode active material. As a result, they found that when an electrolyte satisfying the composition of the present disclosure is applied to a lithium metal battery, it exhibits remarkably improved stability, as compared with the existing electrolytes, and greatly improves the lifespan and high rate charging performance of the battery, thereby completing the present disclosure. Such an effect of the present disclosure may be secured only when a combination of the lithium salt and the solvent is satisfied, and thus it is difficult to achieve the effect when any one of the components is insufficient.

The 1H,1H,5H-octafluoropentyl-1,1,2,2-tetrafluoroethyl ether (OTE) is a material having the following structural formula, and is used as the solvent for the non-aqueous electrolyte of the present disclosure.

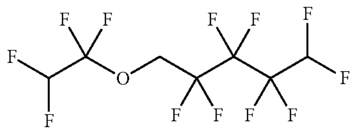 [SMILES: FC(F)C(F)(F)OCC(F)(F)C(F)(F)C(F)(F)C(F)F]

OTE has effects of improving the lifespan characteristics of the battery by suppressing side reactions between the lithium metal and the electrolyte, and improving electrode and separator impregnation by reducing viscosity of high-concentration electrolyte with high viscosity.

However, experimental results of the present inventors showed that when the content of OTE is as too large as more than 32% by volume with respect to the total volume of the non-aqueous solvent used in the electrolyte, the effect of improving the lifespan is slightly reduced. In addition, when the content of OTE is as too small as less than 5% by volume with respect to the total volume of the non-aqueous solvent, the above effect may not be secured. Therefore, in order to secure the effects of improving stability of the electrolyte and improving lifespan characteristics of the battery, OTE is preferably included in an amount of 5% by volume or more, 10% by volume or more, or 20% by volume or more, and 30% by volume or less, 25% by volume or less, or 24% by volume or less with respect to the total volume of the non-aqueous solvent.

In the present disclosure, the cyclic fluorinated carbonate is included, together with the OTE.

The cyclic fluorinated carbonate is not particularly limited, as long as it is a compound in which at least one hydrogen is substituted with fluorine in a cyclic carbonate usually used as a solvent for electrolytes. Specifically, the cyclic fluorinated carbonate may be one or more selected from the group consisting of fluoroethylene carbonate, difluoroethylene carbonate, and trifluoromethylethylene carbonate, and preferably, fluoroethylene carbonate.

The cyclic fluorinated carbonate is preferably included in an amount of 5% by volume or more, or 10% by volume or more, and 30% by volume or less, or 20% by volume or less with respect to the total volume of the non-aqueous solvent. If the content of the cyclic fluorinated carbonate is less than 5% by volume, it is difficult to secure the effect of inhibiting side reactions of the electrolyte, and if the content of the cyclic fluorinated carbonate is more than 30% by volume, the lithium salt is not sufficiently dissociated, and thus ionic conductivity of the electrolyte may not be secured.

Meanwhile, in addition to the OTE and the cyclic fluorinated carbonate, the electrolyte of the present disclosure includes, as the non-aqueous solvent, one or more solvents (hereinafter, referred to as chain solvent) selected from the group consisting of chain carbonate, chain ester, and chain ether solvents.

The electrolyte, which is prepared by mixing the chain solvent, OTE, and cyclic fluorinated carbonate with LiFSI salt, may exhibit excellent stability against lithium metals, whereas electrolytes including a combination of a cyclic solvent, OTE, cyclic fluorinated carbonate, and LiFSI may not achieve the above effect, which may be confirmed from the results of exemplary embodiments below.

The chain solvent may be used in an amount of 40% by volume or more, or 50% by volume or more, and 85% by volume or less, 70% by volume or less, or 65% by volume or less with respect to total volume of the non-aqueous solvent of the electrolyte.

The electrolyte according to one embodiment of the present disclosure may include only the OTE, cyclic fluorinated carbonate, and chain solvent as the solvent, and may not include another solvents. In other words, the chain solvent may be used as the remainder of the solvent, excluding OTE and cyclic fluorinated carbonate.

As the chain solvent, any chain solvent commonly used in electrolytes for lithium secondary batteries may be used without limitation.

Specifically, the chain carbonate may be one or more selected from the group consisting of dimethyl carbonate, diethyl carbonate, dipropyl carbonate, ethylmethyl carbonate, methylpropyl carbonate, and ethylpropyl carbonate.

The chain ester may be one or more selected from the group consisting of methyl acetate, ethyl acetate, propyl acetate, methyl propionate, ethyl propionate, and propyl propionate.

The chain ether may be one or more selected from the group consisting of diethyl ether, dipropyl ether, methylpropyl ether, and ethylpropyl ether.

Preferably, one or more solvents selected from the group consisting of the chain carbonate, chain ester, and chain ether solvents may be one or more selected from the group consisting of dimethyl carbonate, diethyl carbonate, methyl propionate, ethyl propionate, and diethyl ether.

The electrolyte according to one preferred embodiment of the present disclosure may include, as the non-aqueous solvent, OTE; fluoroethylene carbonate as the cyclic fluorinated carbonate; and dimethyl carbonate as the chain solvent. In this regard, OTE may be included in an amount of 10% by volume to 30% by volume, or 20% by volume to 25% by volume; fluoroethylene carbonate may be included in an amount of 10% by volume to 20% by volume; and dimethyl carbonate may be included in an amount of 50% by volume to 65% by volume with respect to the total volume of the non-aqueous solvent.

Meanwhile, the electrolyte for a lithium metal secondary battery of the present disclosure includes lithium bis(fluorosulfonyl)imide (LiFSI) as the lithium salt.

The LiFSI is preferably included in an amount of 20% by weight to 50% by weight, or 30% by weight to 40% by weight with respect to the total weight of the electrolyte. When the content of LiFSI is less than 20% by weight, there is a problem in that corrosion of a positive electrode current collector (e.g., aluminum foil) and transition metal elution of a positive electrode active material may occur, and when the content of LiFSI is more than 50% by weight, there are problems of deterioration of performance due to low ionic conductivity and reduction of impregnation due to high viscosity, which are not preferable.

The electrolyte of the present disclosure may include only the LiFSI as the lithium salt, or may further include another lithium salt in addition to LiFSI. The lithium salt included in addition to LiFSI is included in the range of 0.1% by weight to 3% by weight with respect to total weight of the electrolyte, which is preferable in terms of securing lifespan of the lithium metal battery.

The lithium salt which may be included in addition to LiFSI may be LiCl, LiBr, LiI, $LiClO_4$, $LiBF_4$, $LiB_{10}Cl_{10}$, $LiPF_6$, $LiAsF_6$, $LiSbF_6$, $LiAlCl_4$, LiSCN, $LiC_4BO_8$, $LiCF_3CO_2$, $LiCH_3SO_3$, $LiCF_3SO_3$, $LiN(SO_2CF_3)_2$, $LiN(SO_2C_2F_5)_2$, $LiC_4F_9SO_3$, $LiC(CF_3SO_2)_3$, $(CF_3SO_2)_2NLi$, lithium chloroborate, lower aliphatic carboxylic acid lithium, lithium tetraphenylborate, lithium imide, etc. which are commonly used in electrolytes.

In this regard, the total concentration of LiFSI and another lithium salt in the electrolyte is preferably more than 2.0 M (mol/L) and 4.0 M or less. At such a high salt concentration, side reactions between the lithium metal and the electrolyte may be suppressed, and the effects of preventing corrosion of the positive electrode current collector and transition metal elution of the positive electrode active material may be secured.

In one embodiment, the concentration of the lithium salt in the electrolyte may be 2.1 M or more, or 2.3 M or more, and 3.5 M or less, 3.0 M or less, or 2.6 M or less. If the concentration of the lithium salt is too high, there are problems of deterioration of performance due to low ionic conductivity and reduction of electrolyte impregnation due to high viscosity. Therefore, the concentration is appropriately controlled within the above range.

The above-described electrolyte for a lithium metal secondary battery of the present disclosure includes the OTE, the cyclic fluorinated carbonate, and the chain solvent, and includes LiFSI as the lithium salt, thereby exhibiting excellent stability against the lithium metal electrode and the effect of remarkably reducing side reactions during operation of the battery. Accordingly, when the electrolyte of the present disclosure is applied to a lithium metal secondary battery, lifespan characteristics of the battery may be remarkably improved, and high rate charging performance may be improved.

Lithium Metal Secondary Battery

According to one embodiment of the present disclosure, provided is a lithium metal secondary battery including the above-described electrolyte. Specifically, the lithium metal secondary battery includes a positive electrode, a negative electrode including a lithium metal as an active material, and a separator, and the above-described electrolyte of the present disclosure as an electrolyte.

(1) Positive Electrode

The positive electrode includes a positive electrode active material layer coated on a positive electrode current collector. The positive electrode active material layer may include a positive electrode active material, a binder, and optionally, a conductive material.

The positive electrode current collector is not particularly limited, as long as it has high conductivity without causing chemical changes in the battery. For example, stainless steel, aluminum, nickel, titanium, sintered carbon, or aluminum or stainless steel having a surface treated with carbon, nickel, titanium, or silver may be used. In this regard, the positive electrode current collector may be used in various forms including films, sheets, foils, nets, porous structures, foams, or non-woven fabrics with fine irregularities on the surface thereof so as to enhance adhesive strength to the positive electrode active material.

As the positive electrode active material, a compound known in the art to allow reversible intercalation and deintercalation of lithium may be used without limitation. Specifically, the positive electrode active material may be a lithium composite metal oxide including one or more metals such as cobalt, manganese, nickel, or aluminum, and lithium.

The lithium composite metal oxide may include lithium-manganese-based oxides (e.g., $LiMnO_2$, $LiMn_2O_4$, etc.), lithium-cobalt-based oxides (e.g., $LiCoO_2$, etc.), lithium-nickel-based oxides (e.g., $LiNiO_2$, etc.), lithium-nickel-manganese-based oxides (e.g., $LiNi_{1-Y}Mn_YO_2$ (wherein $0<Y<1$), $LiMn_{2-Z}Ni_ZO_4$ (wherein $0<Z<2$), etc.), lithium-nickel-cobalt-based oxides (e.g., $LiNi_{1-Y1}Co_{Y1}O_2$ (wherein $0<Y1<1$), etc.), lithium-manganese-cobalt-based oxides (e.g., $LiCo_{1-Y2}Mn_{Y2}O_2$ (wherein $0<Y2<1$), $LiMn_{2-Z1}Co_{Z1}O_4$ (wherein $0<Z1<2$), etc.), lithium-nickel-manganese-cobaltbased oxides (e.g., $Li(Ni_pCo_qMn_{r1})O_2$ (wherein $0<p<1$, $0<q<1$, $0<r1<1$, $p+q+r1=1$) or $Li(Ni_{p1}Co_{q1}Mn_{r2})O_4$ (wherein $0<p1<2$, $0<q1<2$, $0<r2<2$, $p1+q1+r2=2$), etc.), or lithium-nickel-cobalt-transition metal(M) oxides (e.g., $Li(Ni_{p2}Co_{q2}Mn_{r3}M_{s2})O_2$ (wherein M is one or more selected from the group consisting of Al, Fe, V, Cr, Ti, Ta, Mg, and Mo, p2, q2, r3 and s2 represent an atomic fraction of each independent element and satisfy $0<p2<1$, $0<q2<1$, $0<r3<1$, $0<s2<1$, $p2+q2+r3+s2=1$), etc.), and any one compound thereof or two or more compounds thereof may be included.

The binder is used for bonding between the electrode active material and the conductive material and bonding with respect to the current collector. Non-limiting examples of the binder may include polyvinylidene fluoride (PVDF), polyvinyl alcohol (PVA), polyacrylic acid (PAA), polymethacrylic acid (PMA), polymethylmethacrylate (PMMA), polyacrylamide (PAM), polymethacrylamide, polyacrylonitrile (PAN), polymethacrylonitrile, polyimide (PI), alginic acid, alginate, chitosan, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), sulfonated-EPDM, styrene-butadiene rubber (SBR), fluorine rubber, various copolymers thereof, etc.

The conductive material is used for further improving conductivity of the electrode active material. The conductive material is not particularly limited as long as it has conductivity without causing chemical changes in the battery. For example, graphite such as natural graphite, artificial graphite, etc.; carbon blacks such as carbon black, acetylene black, ketjen black, channel black, furnace black, lamp black, thermal black, etc.; conductive fibers such as a carbon fiber, a metallic fiber, etc.; metallic powders such as carbon fluoride powder, aluminum powder, nickel powder, etc.; conductive whiskers such as zinc oxide, potassium titanate, etc.; conductive metal oxides such as titanium oxide, etc.; polyphenylene derivatives; and the like.

A method of manufacturing the positive electrode is not particularly limited. For example, the positive electrode may be manufactured by applying an active material slurry, which is prepared by mixing an active material, a binder, and optionally, a conductive material in an organic solvent, on a current collector, and drying the same, and optionally, compression molding to the current collector in order to improve electrode density.

As the organic solvent, it is preferable to use an organic solvent which may uniformly disperse the active material, the binder, and the conductive material, and may easily evaporate. Specific examples may include N-methylpyrrolidone, acetonitrile, methanol, ethanol, tetrahydrofuran, water, isopropyl alcohol, etc., but are not limited thereto.

(2) Negative Electrode

The negative electrode of the present disclosure is a lithium metal negative electrode using lithium metal as a negative electrode active material. The lithium metal negative electrode used in assembling a lithium metal secondary battery may consist of only the current collector, may be in the form of a lithium metal-plated current collector, or may consist of only lithium metal.

The negative electrode current collector is not particularly limited, as long as it has conductivity without causing chemical changes in the battery. For example, stainless steel, aluminum, nickel, titanium, sintered carbon, or copper or stainless steel having a surface treated with carbon, nickel, titanium, or silver, an aluminum-cadmium alloy or the like may be used. Further, the negative electrode current collector may be used in various forms including films, sheets, foils, nets, porous structures, foams, or non-woven fabrics with or without fine irregularities on the surface thereof. For example, a copper foil may be used as the negative electrode current collector, but is not limited thereto.

The thickness of the current collector is not particularly limited, but is preferably 5 μm to 100 μm, and more preferably 5 μm to 50 μm. When the thickness of the current collector is less than 5 μm, it may be difficult to handle in the process. When it exceeds 100 μm, the thickness and weight of the battery may be unnecessarily increased, and thus the energy density may be reduced. Therefore, the above range is preferable in terms of battery performance.

When an electrode consisting of only the current collector is used as a negative electrode in assembling a battery, lithium ions transferred from a positive electrode by the initial charging and discharging after assembling of the battery may be irreversibly plated on the negative electrode current collector to form a lithium metal layer, which may act as a negative electrode active material layer.

Alternatively, a negative electrode including lithium metal as an active material may be used from the beginning of battery assembly. In this case, a method of coating the lithium metal on the negative electrode current collector is not particularly limited. For example, a method of laminating a thin film of lithium metal on the current collector and then roll-compressing the same, a method of performing electroplating or electroless plating of lithium metal on the current collector, etc. may be used. In this regard, the thickness of the lithium metal layer of the negative electrode is not particularly limited, but may be 10 μm or more, or 20 μm or more, and 50 μm or less, or 40 μm or less.

Meanwhile, with regard to the lithium metal negative electrode consisting of only lithium metal, the thickness thereof is not particularly limited, but may be 10 μm or more, or 20 μm or more, and 50 μm or less, or 40 μm or less.

(3) Separator

The separator may separate the negative electrode and the positive electrode and may provide a path through which lithium ions pass. Those commonly used in lithium batteries may be used. In other words, a separator having low resistance to migration of ions in an electrolyte and a high electrolyte-retaining ability may be used. For example, the separator may be selected from a glass fiber, polyester, Teflon, polyethylene, polypropylene, polytetrafluoroethylene (PTFE), and a combination thereof, each of which may be a nonwoven fabric or a woven fabric.

For example, a polyolefin-based polymer separator such as polyethylene, polypropylene, etc. may be used, or a separator including a coating layer containing a ceramic component or a polymeric material may be used in order to secure heat resistance or mechanical strength. The separator may have a single layer or may have multiple layers. In one exemplary embodiment, as the separator, a separator prepared by coating a ceramic coating material containing ceramic particles and an ionic binder polymer on both sides of a polyolefin-based polymer substrate may be used.

A method of manufacturing the lithium metal secondary battery of the present disclosure is not particularly limited, and for example, an electrode assembly, in which the positive electrode, the separator, and the negative electrode are sequentially stacked, is prepared, and the electrode assembly is inserted into a battery case, and then the electrolyte according to the present disclosure is injected into the upper part of the case, and sealed with a cap plate and a gasket to manufacture the lithium metal secondary battery.

The type of lithium metal secondary battery as described above is not particularly limited, and may be, for example, a jelly-roll type, a stack type, a stack-folding type (including a stack-Z-folding type), or a lamination-stack type.

The lithium metal secondary battery thus manufactured may exhibit excellent battery lifespan characteristics and high rate charging performance, since side reactions between the lithium metal electrode and the electrolyte are remarkably reduced.

Hereinafter, preferred exemplary examples will be provided for better understanding of the present disclosure. However, the following exemplary examples are provided only for illustrating the present disclosure, and it is obvious to those skilled in the art that various changes and modifications are possible within the scope and spirit of the present disclosure, and such changes and modifications fall within the scope of the appended claims.

EXAMPLES

Examples 1 and 2 and Comparative Examples 1 to 3: Manufacture of Lithium Metal Secondary Battery (1) Preparation of Positive Electrode NCM 811 ($LiNi_{0.8}Co_{0.1}Mn_{0.1}O_2$) as a positive electrode active material, carbon black as a conductive material, and polyvinylidene fluoride (PVdF) as a binder were used, and N-methylpyrrolidone as a solvent was used to prepare a positive electrode active material slurry, in which a weight ratio of active material:conductive material:binder was 96:2:2. Thereafter, the positive electrode active material slurry was coated on both sides of an aluminum foil having a thickness of 12 μm, and roll-pressed and dried to prepare a positive electrode of which loading was 3.8 $mAh/cm^2$.

(2) Preparation of Negative Electrode

A lithium metal foil having a thickness of 12 μm was laminated on one side of a copper foil having a thickness of 8 μm, and roll-pressed to prepare a lithium metal negative electrode.

(3) Preparation of Electrolyte

Electrolytes of Examples and Comparative Examples were prepared according to the compositions of Table 1 below. In the following Table, DMC represents dimethyl carbonate (linear carbonate), EC represents ethylene carbonate (cyclic carbonate), FEC represents fluoroethylene carbonate, and OTE represents 1H,1H,5H-octafluoropentyl-1,1,2,2-tetrafluoroethyl ether. In addition, in the following Table, the content (wt %) of lithium salt represents % by weight with respect to the total weight of the electrolyte, the concentration (M) of lithium salt represents the number of moles (mol) of lithium salt per 1 L of the total solvent in the electrolyte, the content of each solvent represents % by volume of each solvent with respect to the total volume of the electrolyte solvent.

TABLE 1

| | Lithium salt (wt %) | Solvent (vol %) | | | | Concentration of lithium |
|---|---|---|---|---|---|---|
| | LiFSI | DMC | EC | FEC | OTE | salt (M) |
| Comparative Example 1 | 45 | 85 | — | 15 | — | 3.2 |
| Comparative Example 2 | 30 | 52 | — | 8 | 40 | 2.3 |
| Comparative Example 3 | 32 | 55 | 10 | 11 | 20 | 2.3 |
| Comparative Example 4 | 20 | 50 | | 10 | 20 | 1.4 |
| Comparative Example 5 | 50 | 25 | | 6 | 18 | 4.3 |
| Example 1 | 35 | 65 | — | 10 | 25 | 2.6 |
| Example 2 | 32 | 60 | — | 16 | 20 | 2.3 |

(4) Assembly of Battery

The separator and the negative electrode of (2) were stacked on both sides of the positive electrode of (1) to manufacture a pouch-type bi-cell having a capacity of 125 mAh, in which they were stacked in this order of negative electrode/separator/positive electrode/separator/negative electrode. In this regard, a separator, in which alumina having a thickness of 2.5 μm was coated on both sides of a polyethylene fabric having a thickness of 7 μm, was used as the separator.

Each 200 μl (1.6 ul/mAh) of the electrolytes prepared in (3) was injected into the pouch to manufacture batteries of Examples 1 and 2 and Comparative Examples 1 to 5, respectively.

Experimental Example: Evaluation of Lifespan Characteristics at Room Temperature (25° C.) and High Temperature (45° C.)

For the batteries of Examples and Comparative Examples, charging and discharging were repeated at 25° C. with a standard charge/discharge current density of 0.2C/2.0C, a final charge voltage of 4.25 V, and a final discharge voltage of 2.5 V. At this time, the cycle at which capacity retention represented by Equation 1 was 80% was recorded, and shown in Table 2 below. In addition, the same experiment was performed at 45° C. for the batteries of Example 2 and Comparative Example 1, and the results are shown in Table 2 below.

$$\text{Capacity retention (\%)}=(\text{discharge capacity at the } n^{th} \text{ cycle}/\text{discharge capacity at the first cycle})*100 \quad \text{[Equation 1]}$$

TABLE 2

| | Lifespan performance at 25° C. (80% capacity retention) | Lifespan performance at 45° C. (80% capacity retention) |
|---|---|---|
| Comparative Example 1 | 41 cycles | 32 cycles |
| Comparative Example 2 | 72 cycles | — |
| Comparative Example 3 | 77 cycles | — |
| Comparative Example 4 | 52 cycles | 2 cycles |
| Comparative Example 5 | 13 cycles | 21 cycles |

TABLE 2-continued

| | Lifespan performance at 25° C. (80% capacity retention) | Lifespan performance at 45° C. (80% capacity retention) |
|---|---|---|
| Example 1 | 136 cycles | — |
| Example 2 | 194 cycles | >200 cycles |

Referring to Table 2 and FIGS. 1 to 2, the electrolytes including OTE of Examples were confirmed to exhibit remarkably improved lifespan characteristics at room temperature and high temperature, as compared with that of Comparative Example 1. However, Comparative Example 2 showed that excessive OTE did not secure the effect of improving the lifespan. As compared with Example 2 and Comparative Example 3, it was confirmed that when the cyclic solvent was used, instead of the chain solvent, in the electrolyte to which OTE was applied, the lifespan characteristics were remarkably reduced. Meanwhile, Comparative Example 4 showed that when lithium salt was used at the low concentration of 2.0 M or less, corrosion of the positive electrode current collector (aluminum) occurred, and lifespan performance at the high temperature was greatly reduced. In contrast, Comparative Example 5 showed that when lithium salt was used at the excessively high concentration of more than 4.0 M, impregnation of the electrolyte was not secured, and thus lifespan performances at room temperature and high temperature were not normally expressed.

The invention claimed is:

1. A lithium metal secondary battery comprising:

a positive electrode;

a lithium metal negative electrode;

a separator between the positive electrode and the negative electrode; and an electrolyte comprising a lithium salt and a non-aqueous solvent, wherein a concentration of the lithium salt is more than 2.2 M to 2.4 M or less, and wherein the lithium salt consists of lithium bis(fluorosulfonyl)imide, wherein the non-aqueous solvent consists of 1H,1H,5H-octafluoropentyl-1,1,2,2-tetrafluoroethyl ether (OTE); a cyclic fluorinated carbonate; and one or more chain solvents selected from the group consisting of chain carbonate and chain ester, and wherein the 1H,1H,5H-octafluoropentyl-1,1,2,2-tetrafluoroethyl ether is included in an amount of 19% by volume to 21% by volume with respect to a total volume of the non-aqueous solvent, wherein the cyclic fluorinated carbonate comprises fluoroethylene carbonate (FEC) and is included in an amount of 15% to 17% by volume with respect to the total volume of the non-aqueous solvent, wherein the chain carbonate comprises dimethyl carbonate (DMC) and is included in an amount of 59% to 61% by volume with respect to the total volume of the non-aqueous solvent, wherein the electrolyte does not include any solvent other than 1H,1H,5H-octafluoropentyl-1,1,2,2-tetrafluoroethyl ether, the cyclic fluorinated carbonate-based solvent and the chain solvents.

2. The lithium metal secondary battery of claim 1, wherein the cyclic fluorinated carbonate further comprises one or more selected from the group consisting of difluoroethylene carbonate, and trifluoromethylethylene carbonate.

3. The lithium metal secondary battery of claim 1, wherein the chain carbonate further comprises one or more selected from the group consisting of diethyl carbonate, dipropyl carbonate, ethylmethyl carbonate, methylpropyl carbonate, and ethylpropyl carbonate.

4. The lithium metal secondary battery of claim 1, wherein the chain ester further comprises one or more selected from the group consisting of methyl acetate, ethyl acetate, propyl acetate, methyl propionate, ethyl propionate, and propyl propionate.

5. The lithium metal secondary battery of claim 1, wherein lithium bis(fluorosulfonyl)imide is included in an amount of 20% to 50% by weight with respect to the total weight of the electrolyte.

* * * * *